(12) United States Patent
Fay et al.

(10) Patent No.: US 8,642,689 B2
(45) Date of Patent: *Feb. 4, 2014

(54) OXIDISING AGENTS FOR ELASTOMER BONDING COMPOSITIONS

(75) Inventors: Nigel Fay, Kildare (IE); Brendan J. Kneafsey, Dublin (IE); Darren Nolan, Dublin (IE); David P. Birkett, Kildare (IE); Susan Warren, Wexford (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 124 days.

This patent is subject to a terminal disclaimer.

(21) Appl. No.: 13/234,919

(22) Filed: Sep. 16, 2011

(65) Prior Publication Data

US 2012/0003501 A1  Jan. 5, 2012

Related U.S. Application Data

(63) Continuation of application No. PCT/EP2010/053317, filed on Mar. 15, 2010.

(60) Provisional application No. 61/160,504, filed on Mar. 16, 2009.

(51) Int. Cl.
- *B60C 1/00* (2006.01)
- *C08K 5/24* (2006.01)
- *B32B 9/00* (2006.01)
- *B32B 19/00* (2006.01)

(52) U.S. Cl.
USPC .......................................... 524/261; 428/689

(58) Field of Classification Search
USPC .......................................... 524/261; 428/689
See application file for complete search history.

(56) References Cited

U.S. PATENT DOCUMENTS

| | | | |
|---|---|---|---|
| 3,542,639 A * | 11/1970 | Manino | 428/418 |
| 3,824,217 A | 7/1974 | Barker | |
| 3,859,258 A | 1/1975 | Manino | |
| 4,031,120 A | 6/1977 | Gervase | |
| 4,581,092 A | 4/1986 | Westley | |
| 4,994,519 A | 2/1991 | Scheer | |
| 5,888,602 A | 3/1999 | Davis et al. | |
| 8,303,762 B2 * | 11/2012 | Fay et al. | 156/330.9 |
| 2004/0249026 A1 * | 12/2004 | Tsuji et al. | 524/81 |

FOREIGN PATENT DOCUMENTS

EP  0287190  10/1988

OTHER PUBLICATIONS

International Search Report issued in connection with International Patent Application No. PCT/EP2010/053317 mailed Jun. 22, 2010.
"Oxidantien", In: Jurgen Falbe, Manfred Regitz: "Rompp Chemie Lexikon", Georg Thieme Verlag, Stuttgart New York, XP002584995, p. 316 left-hand col. (1991).

* cited by examiner

*Primary Examiner* — Angela C Scott
(74) *Attorney, Agent, or Firm* — Steven C. Bauman

(57) ABSTRACT

Compositions comprising at least one copper salt, and an aromatic nitroso compound precursor are provided. The copper salt may oxidize the aromatic nitroso compound precursor to provide an aromatic nitroso compound. The compositions may find utility in polymer to metal, in particular, rubber to metal bonding. The aromatic nitroso compound precursor may be a nitrosobenzene/dinitrosobenzene precursor. The nitrosobenzene or dinitrosobenzene precursor may be at least one of a quinone oxime or a quinone dioxime.

19 Claims, No Drawings

OXIDISING AGENTS FOR ELASTOMER BONDING COMPOSITIONS

BACKGROUND

1. Field

The present invention relates to the use of oxidising agents in adhesive compositions suitable for use in polymer to substrate, such as elastomer to substrate, for example polymer-to-metal, such as elastomer-to-metal including rubber-to-metal bonding applications. The oxidising agents transform a latent cross linking agent into a species capable of actively crosslinking elastomers comprising diene and or allylic functional groups and are suitable for use in the above bonding applications and in particular in rubber to metal bonding applications.

2. Brief Description of Related Technology

Polymer to metal and in particular rubber to metal bonding has been practised for many years. There are many applications for formulations which achieve polymer or rubber to metal bonding. Rubber to metal bonding is widely used to bond different metals to a natural or synthetic rubber. Polymer to metal bonding is carried out for many reasons.

One aspect of rubber to metal bonding is to combine the structural strength of the metal with the elastomeric properties of the rubber. Accordingly, metal and polymers such as rubber, in particular, are often bonded to each other for impact absorption applications, such as bearings, wheels, shock absorbers, moving arms, etc. Such components can be utilised on a very small scale, for example in PC components or on a very large scale for example in constructions such as bridges and buildings. Noise reduction may also be achieved by utilising metal to rubber bonding. It is accepted that tremendous forces can be experienced by any component which comprises metal and rubber bonded together. Accordingly, it is desirable to provide metal to rubber bonding that can withstand significant forces such as compressive or extensive forces, including shocks, without having the metal or the rubber separate from each other. There are many other applications where rubber to metal bonding is desirable, for example in tyre production where internal wire reinforcements for the tyre are bonded to the rubber of the tyre.

Generally, an adhesive formulation is provided to bond a selected rubber to a selected metal substrate. Traditional rubber-to-metal bonding technology consists of a primer layer and also an adhesive layer, forming an overall 2-coat system. The primer system generally consists of solutions or suspensions of chlorinated rubber and phenolic resins containing reactive groups, and also pigments such as titanium dioxide, zinc oxide, carbon black, etc. The primer is generally applied as a thin layer onto a treated (cleaned) surface of a metallic component such as a treated steel component for example a component that has been grit blasted or chemically treated.

The adhesive layer can consist of a large range of elastomeric materials such as rubber materials and cross-linkers. These include, but are not restricted to, chlorinated and bromochlorinated rubbers, aromatic dinitrosobenzene compounds and bismaleimide as cross-linkers, xylene, perchloroethylene and ethylbenzene as solvents, and also some inorganic lead or zinc salt.

The most common cross-linking agents that have been employed in rubber-to-metal bonding technology are aromatic nitroso compounds, such as p-dinitrosobenzene. The mechanism of cross-linking to an alkene group within a rubber, such as a diene or allylic moiety, is by means of a pericyclic reaction.

In the many fields where rubber to metal bonding is employed there are numerous opportunities to address several types of problems, including bond strength and durability, sample preparation, ease of application of the adhesive, single coat versus two-coat systems, reduced toxicity and improved properties for the environment, to name a few.

Dinitroso compounds are ordinarily used in rubber bonding formulations. The high toxicity of these dinitroso compounds, in particular, poses serious handling and safety problems. In addition dinitroso compounds can exhibit fuming at elevated temperatures which aggravates the problem of mold fouling.

Different formulations for rubber to metal bonding are the subject of many patent publications. Lord Corporation has conducted studies in the area of use of oxime and dioxime materials. For example as set out in European Patent Document No. EP0287190, an adduct of any aromatic dioxime (quinone dioxime is preferred) and a polyisocyanate (toluene diisocyanate is preferred) is formed in a ratio of greater then 2:1, and rubber to metal bonds formed.

U.S. Pat. No. 4,581,092 discloses an adhesive system that includes a butyl rubber, a polyisocyanate compound, and at least one of a nitroso compound and an oxime compound, with the oxime compound requiring the additional presence of an oxidizing agent, including $Pb_3O_4$, $PbO_2$, $MnO$ and $V_2O_5$. The oxidizing agent is present at a level of 2 to 3 parts per part of aryl dioxime compound.

U.S. Pat. No. 3,824,217 discloses combining an oxime compound with an excess of a polyisocyanate compound, so that all oxime groups react with isocyanate. The resulting compound could be used in compositions for bonding rubbers to primed metal substrates. U.S. Pat. No. 3,859,258 also reports an oxime-isocyanate product for use in rubber to metal technology.

U.S. Pat. No. 4,994,519 is directed to a quinone dioxime system that has rubber to metal bonding performance without the use of an oxidant, when present with chlorinated rubber, brominated polybutadiene, carbon black and from 5 to 25% by weight of ground sulfur. The use of free sulfur however is not widely accepted within the industry.

U.S. Pat. No. 4,031,120 describes a composition comprising an isocyanate functional organosilane, in combination with a polyisocyanate and an aromatic nitroso compound. The resulting system is described as a one-coat adhesive for bonding a variety of elastomeric materials to metals and other substrates. In this patent an isocyanate is reacted with a functional alkoxy silane such as amino, hydroxy, or mercapto.

Notwithstanding the state of the art it would be desirable to provide alternative elastomer bonding compositions addressing the issues raised above, such that improved consumer choice results.

SUMMARY

The present invention provides compositions suitable for polymer to substrate, such as elastomer to substrate, for example elastomer to metal bonding such as for use in rubber to metal bonding. Natural and synthetic rubbers are included within the term rubber as used herein. The rubber may be a blended material.

In one aspect the present invention provides for a bonding composition comprising:
 a) at least one copper compound; and
 b) at least one aromatic nitroso compound precursor.

The copper compound may oxidise the at least one aromatic nitroso compound precursor to generate an aromatic nitroso compound in-situ.

As will be appreciated by a person skilled in the art, compositions of the present invention may further comprise adhesion promoting agents. The adhesion promoting agent may promote crosslinking between the aromatic nitroso compound and the elastomer substrate or may provide for improved adhesion to a substrate. For example, the adhesion promoting agent may be a silane.

As used herein, the term aromatic nitroso compound precursor refers to any compound that is capable of being transformed into an aromatic nitroso compound with at least one nitroso group. The aromatic nitroso compound precursor may comprise any aromatic oxime, aromatic dioxime and combinations thereof. The aromatic nitroso compound precursor may be the mono- or dioxime of a compound selected from the group consisting of:

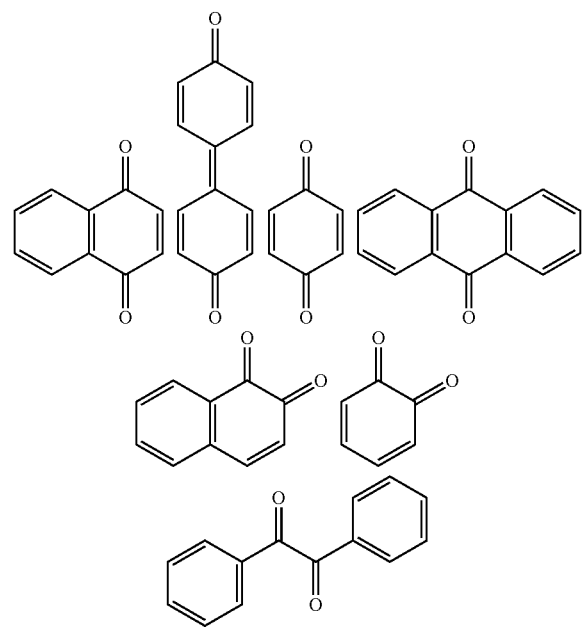

As will be appreciated by a person skilled in the art, the diketone structures disclosed above may optionally be substituted one or more times, for example with at least one of $C_1$-$C_{20}$ alkyl, $C_1$-$C_{20}$ cycloalkyl, $C_1$-$C_{20}$ alkoxy, $C_6$-$C_{20}$ aralkyl, $C_6$-$C_{20}$ alkaryl, $C_6$-$C_{20}$ arylamine, $C_6$-$C_{20}$ arylnitroso, cyano, amino, hydroxy, halogen and combinations thereof. Such substitutions may be possible provided there is no interference with effective bonding or curing of the compositions. For example, provided there is no interference with the generation of an aromatic nitroso compound in-situ.

Desirably, the aromatic nitroso compound precursor is selected from the group consisting of p-benzoquinone dioxime (QDO), naphthoquinone dioxime, toluquinone dioxime, diphenoquinone dioxime, diquinoyl dioxime, dibenzoyl dioxime and combinations thereof. The above list serves as a generalised example only and other aryl oximes and dioximes are possible and embraced by the present invention.

The at least one aromatic nitroso compound precursor of the composition of the present invention may comprise a nitrosobenzene precursor. The nitrosobenzene precursor may be a mononitrosobenzene precursor, a dinitrosobenzene precursor, or combinations thereof. It will be appreciated that the nitrosobenzene precursor may form a nitrosobenzene or dinitrosobenzene structure in-situ upon oxidation.

As will be appreciated by a person skilled in the art, references to nitrosobenzenes and nitrosobenzene precursors include nitrosobenzene and nitrosobenzene precursors that may optionally be substituted one or more times with at least one of $C_1$-$C_{20}$ alkyl, $C_1$-$C_{20}$ cycloalkyl, $C_1$-$C_{20}$ alkoxy, $C_6$-$C_{20}$ aralkyl, $C_6$-$C_{20}$ alkaryl, $C_6$-$C_{20}$ arylamine, $C_6$-$C_{20}$ arylnitroso, cyano, amino, hydroxy, halogen and combinations thereof. Such substitutions may be possible provided there is no interference with effective bonding or curing of the compositions. For example, provided there is no interference with the generation of a nitrosobenzene in-situ.

Desirably, the nitrosobenzene precursor comprises p-benzoquinone oxime or p-benzoquinone dioxime (QDO). It has been found that such structures assist in the formation of desirable bonds. For example, the nitrosobenzene precursor may be selected from the group consisting of:

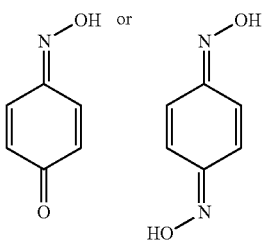 [SMILES: O=C1C=CC(=NO)C=C1 ; "or" ; ON=C1C=CC(=NO)C=C1]

or combinations thereof.

QDO is generally used as a vulcanizing agent for EPDM (ethylene-propylene diene monomer) to improve heat resistance. It is also used as a rubber to metal adhesion promoter and as a curing agent.

The aromatic nitroso compound precursor of the composition of the present invention may comprise at least one silane moiety (an aromatic nitrososilane precursor). The silane moiety may be an alkoxysilane. Advantageously, alkoxysilanes may enhance adhesion to particular surfaces, for example metal surfaces. For example, the aromatic nitrososilane precursor may be one of the general formula:

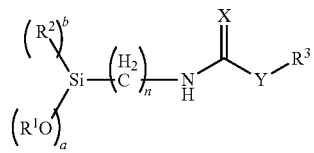

where 'a' can be 1-3 and 'b' can be 0-2; but if a=3, b=0; or if a=2, b=1; so that at least one alkoxy group is present;
$R^1$ can be selected from the group consisting of H, $C_1$-$C_{24}$ alkyl, $C_3$-$C_{24}$ acyl, preferably from $C_1$-$C_4$ alkyl and wherein when a≥1 at least one $R^1$ is not hydrogen; and
$R^2$ can be selected from $C_1$-$C_{24}$ alkyl and $C_3$-$C_{24}$ acyl, preferably from $C_1$-$C_4$ alkyl;
n can be 1-5;
X can be O or S;
Y can be —O, —S, or —$NH_x$ (where x=1 or 2); and
$R^3$ can be a moiety comprising a nitroso aromatic compound precursor.

$R^3$ may be a moiety comprising nitrosobenzene, or a nitrosobenzene precursor. Preferably, $R^3$ comprises a quinone dioxime or quinone oxime moiety. Such materials are readily available from commercial suppliers.

$R^1$ may be selected from $C_1$-$C_{24}$ alkyl, $C_3$-$C_{24}$ acyl. $R^1$ may be selected from $C_1$-$C_{24}$ alkyl, $C_3$-$C_{24}$ acyl and 'a' may be 3. X may be O. Y may be O or —$NH_x$ (where x=1). $R^1$ may be selected from $C_1$-$C_4$ alkyl, X may be O and 'a' is 3. $R^1$ may be selected from $C_1$-$C_4$ alkyl, X may be O, Y may be O and 'a' may be 3. $R^1$ may be selected from $C_1$-$C_4$ alkyl, X may be O, Y may be —$NH_x$ (where x=1) and 'a' may be 3. $R^1$ may be selected from $C_1$-$C_4$ alkyl, X may be O, Y may be O, 'a' may be 3 and $R^3$ may be a moiety comprising nitrosobenzene. Other suitable nitrososilanes are disclosed in U.S. patent application Ser. No. 12/055,908, the disclosure of which is hereby incorporated herein by reference.

The at least one aromatic nitroso compound precursor may be present in an amount of 1 to 20% w/w of the total composition. Suitably, the at least one aromatic nitroso compound precursor may be present in an amount of 1 to 10% w/w, for example 2 to 7% w/w. The at least one aromatic nitroso compound precursor may be present in 3% w/w of the total composition.

In the compositions of the present invention the oxidant is a copper compound. For example, the copper compound may be a Cu(I) or Cu(II) compound. The copper compound may be a Cu(0) compound which may oxidise in situ to a Cu(I) or Cu(II) compound. The copper compound may be metallic copper, copper salts, copper oxides or combinations thereof. Suitable copper compounds may be selected from the group consisting of copper nanopowder, CuO, $Cu_2O$, CuSCN, $Cu(SCN)_2$ and combinations thereof. The copper compound may be CuSCN, $Cu(SCN)_2$ or combinations thereof. The copper may be CuSCN. The oxidant may be copper thiocyanate.

The copper compound may be present in an amount of 1 to 20% w/w of the total composition. Suitably, the copper compound may be present in an amount of 1 to 10% w/w, for example 2 to 7% w/w. The copper compound may be present in 4% w/w.

The copper compound (or oxidant) may be encapsulated. The encapsulant material may be selected from the group consisting of hard, polymerised material, gelatin or resin. For example, suitable resins may comprise urea/formaldehyde resin.

A general scheme for the oxidation of quinone dioxime to the dinitrosobenzene species using a copper oxidant is shown below:

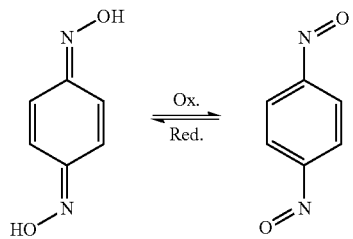

Compositions suitable for bonding metal to rubber may be formulated utilising appropriate amounts of a copper oxidant according to the present invention.

Compositions of the present invention may be one-part compositions. Compositions of the present invention may be two-part compositions.

The compositions of the present invention may further comprise a suitable carrier vehicle for the aromatic nitroso compound precursor and or copper salt. It will be appreciated that any suitable carrier vehicle may be utilised. It is desirable that the carrier vehicle is environmentally friendly. For example, the carrier vehicle may be an aqueous-based vehicle. Such compositions of the invention are suitable for use in bonding a substrate such as a metal substrate to a polymer substrate, such as an elastomer, for example a natural or synthetic rubber.

The compositions of the present invention provide for elastomer to substrate bonding, for example elastomer to metal bonding. Compositions of the present invention may assist in the formation of good rubber to metal bonds. Such compositions can be applied at the interface between the rubber and the metal substrates, and may assist in developing strong and durable bonds during the rubber curing process.

Compositions comprising an aromatic nitroso compound precursor with a copper oxidant may overcome the problems associated with the prior art discussed above. Furthermore, the compositions of the invention may be less toxic. This is particularly important prior to vulcanisation.

Compositions of the present invention may find utility in any application where it is desirable to form an aromatic nitroso compound, for example a nitrosobenzene moiety, in-situ. Similarly, compositions of the present invention may find utility in any application where it is desirable to form an aromatic dinitroso compound, for example a dinitrosobenzene moiety, in-situ.

Compositions of the present invention may find utility in bonding a substrate to a natural or synthetic rubber. For example, the compositions may be used for applications where bonding metal to natural or synthetic rubber is required. In particular, compositions of the present invention will provide for in-situ generation of a nitrosobenzene moiety or a dinitrosobenzene moiety.

For example, to achieve good bonding it may be desirable for the compound to react in-situ to form a nitroso aromatic moiety comprising a hydroxy group. The nitroso aromatic moiety comprising a hydroxy group may be a para-nitrosophenol moiety. The phenolic moiety present may help to anchor the para-nitrosophenol moiety to a metal surface. para-Nitrosophenol may be generated in-situ from the oxidation of quinone mono-oxime as shown below:

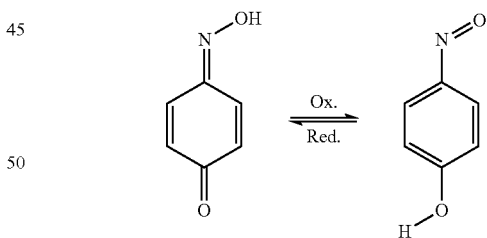

By incorporating aromatic nitroso compound precursors, the compositions of the present invention eliminate the undesirable need to formulate compounds comprising free nitroso groups in adhesive compositions. In-situ oxidation of the aromatic nitroso precursor during the vulcanisation process, which is the phase where bond formation takes place, is desirable.

The compositions of the present invention possess a number of advantages. For example, an adhesive composition absent dinitrosobenzene may be formulated and stored. Such formulations are easily and conveniently applied to substrates in a standard manner. Convenient techniques for application may also be used, for example spraying or dipping. Compositions of the present invention may also have reduced toxicity as compared to conventional dinitrosobenzene formulations.

In addition, compositions according to the present invention are capable of curing to provide excellent bond strengths. For example, in rubber to metal bonding tests to determine the bond strength of the compositions of the present invention, up to 80% rubber failure was observed. Furthermore, the resultant bonds have hot water resistance.

In a further aspect, the present invention extends to a process for bonding two substrates together comprising applying a composition according to the present invention to at least one of the substrates and bringing the substrates together so as to form a bond with the composition.

The at least one substrate may comprise a polymer, such as elastomer to be bonded to another substrate. The at least one substrate may comprise a natural or synthetic rubber to be bonded to another substrate. The first substrate may comprise a polymer, for example an elastomer, such as a natural or synthetic rubber, and the second substrate may comprise a metallic substrate. The first substrate may comprise a metallic substrate to which a composition according to the present invention is applied, and the second substrate may comprise a polymer, such as elastomer, for example a natural or synthetic rubber.

The nitroso aromatic compound of the composition of the present invention may become anchored to the rubber substrate.

The rubber substrate may be vulcanised or crosslinked prior to bonding to the second substrate. Alternatively, the rubber substrate may be vulcanised or crosslinked concurrently with bonding to the second substrate. The second substrate may be a metal.

The present invention allows for bonding of polymers, such as elastomers, for example natural or synthetic rubbers, to other substrates such as metals, as the nitroso groups can react with polymers, in particular a polymer with diene or allylic functionality within the polymer chain. Reaction of a nitroso group and an allylic group on the polymer occurs via an alder-ene reaction. Such a reaction produces a variety of cross-links, for example between the nitroso group and a rubber material.

The present invention provides very good adhesion between elastomeric materials, such as rubber compositions, and metals.

Many different metals may be treated with the composition described in this invention, and may be bonded to polymers, such as elastomeric materials. These metals include, but are not limited to, zinc and zinc alloys such as zinc-nickel and zinc-cobalt alloys, metal substrates having zinc-containing coatings, steel and in particular cold rolled and carbon steel, aluminium and aluminium alloys, copper and copper alloys such as brass, and tin and tin alloys including metal substrates having tin-containing coatings.

In a further aspect, the present invention relates to an assembly comprising a first substrate and a second substrate bonded together by a composition according to the present invention. Desirably, one of the substrates is an elastomer, such as a natural or synthetic rubber. The second substrate may be a metal. The invention further extends to a cure product comprising a polymer, for example an elastomer, such as a natural or synthetic rubber and a composition according to the present invention.

Where suitable, it will be appreciated that all optional and/or preferred features of one embodiment of the invention may be combined with optional and/or preferred features of another/other embodiment(s) of the invention.

DETAILED DESCRIPTION

It should be readily apparent to one of ordinary skill in the art that the examples disclosed hereinbelow represent generalised examples only, and that other arrangements and methods capable of reproducing the invention are possible and are embraced by the present invention.

The compositions of the present invention may suitably comprise any additives conventionally used in common rubber formulations which do not oppose or prevent in situ formation of aromatic nitroso compounds, for example nitrosobenzene or dinitrosobenzene. Illustrative of such additives are reinforcing carbon blacks; inactive fillers such as calcium carbonates, chalks, talcs, or metal oxides; accelerator systems; vulcanization retarders; promoters such as zinc oxide or stearic acid; plasticizers such as aromatic, paraffinic, naphthenic and synthetic mineral oils; ageing, light-protecting ozone-protecting, fatigue, coloration, and processing auxiliaries and sulfur. Commonly these additives may be present at a quantity of about 0.1 parts to about 80 parts per 100 parts by weight of the rubber composition.

Generally, it is desirable that bonding is achieved during a vulcanisation step. Suitable vulcanisation methods include compression moulding, transfer moulding, injection moulding and autoclave heating, for example with steam or hot air. For example semi-solid rubber can be injected into a mould. The semi-solid rubber is then cross-linked into a fully cured rubber and the bond with the substrate is formed at the same time.

The curing system should be stable for use. More specifically, the curing system should be resistant to sedimenting. Accordingly, it is desirable that the curing system has a low tendency to sediment.

Furthermore, the curing system should be easy to apply. For example, it should be convenient to apply by any suitable dispensing system. It is also desirable that it dries quickly so that components can be handled without applied material running off and/or fouling production equipment. It is also desirable that the curing system shows good wetting properties for ease of application and spreading, for instance.

It is also desirable for the composition to have good curing strengths. This curing should be achieved independently of the type of elastomer (rubber) employed and also independently of the type of substrate. It will be appreciated that some rubbers are blended materials and accordingly it is desirable that good curing is achieved with such blended materials. Suitably consistent curing is achieved under various process parameters.

It is desirable that the bonds and in particular the rubber/metal joint, are durable under high pressure and even if exposed to an aggressive atmosphere, for example, a hot liquid such as oil. The bonds should also be durable against relatively high mechanical stress.

EXAMPLES

Prior to application of the primer and adhesive layers, the metal surface to be coated may be cleaned to allow better adhesion. For example, cleaning with solvent or alkaline material. Application can then be conducted by a variety of methods, including dipping, spraying, brushing or wiping the solution onto the metal.

The primer is applied as a thin layer onto a treated (cleaned) surface of a metallic component such as treated steel component. The adhesive layer is applied as a thin layer on top of the dry primer layer. Compositions embraced by the present invention are set out below:

Primer Formulation Example

| Compound identity | % by weight |
|---|---|
| Pergut S130 (a) | 8.3 |
| Titanium Dioxide | 5.1 |
| Carbon Black | 1.3 |
| Aerosil 200 (b) | 1.3 |
| Zinc Oxide | 1.7 |
| Elaztobond A250 (c) | 4.2 |
| SP1055 (d) | 5.1 |
| Methyl Isobutyl Ketone | 63.0 |
| Xylene | 10.0 |

(a) Chlorinated Rubber (from Bayer Material Science);
(b) Fumed Silica (from Evonik);
(c) Phenol Formaldehyde Resin (from SI Group);
(d) Phenolic Resin (from SI Group)

Adhesive Formulation 1:

| Compound identity | % by weight |
|---|---|
| Pergut S130 (a) | 2.0 |
| Xylene | 69.6 |
| Titanium Dioxide | 2.0 |
| Heucophos ZPA (b) | 2.1 |
| Zinc Oxide | 4.2 |
| Chlorosulfonated Polyethylene (c) | 5.5 |
| HVA-2 (d) | 1.1 |
| 4,4-Diphenylbismaleimide | 1.1 |
| Hydrophobic Fumed Silica | 0.8 |
| Carbon Black | 4.5 |
| Quinone Dioxime | 3 |
| $Cu_2O$ | 4 |

(a) Chlorinated Rubber (from Bayer Material Science);
(b) Zinc aluminium orthophosphate hydrate (from Heucotech Ltd.);
(c) Hypalon 40S (DuPont Performance Elastomers);
(d) N,N-m-Phenylene Bismaleimide.

Adhesive Formulation 2:

| Compound identity | % by weight |
|---|---|
| Pergut S130 (a) | 2.0 |
| Xylene | 69.6 |
| Titanium Dioxide | 2.0 |
| Heucophos ZPA (b) | 2.1 |
| Zinc Oxide | 4.2 |
| Chlorosulfonated Polyethylene (c) | 5.5 |
| HVA-2 (d) | 1.1 |
| 4,4-Diphenylbismaleimide | 1.1 |
| Hydrophobic Fumed Silica | 0.8 |
| Carbon Black | 4.5 |
| Quinone Dioxime | 3 |
| CuO | 4 |

(a) Chlorinated Rubber (from Bayer Material Science);
(b) Zinc aluminium orthophosphate hydrate (from Heucotech Ltd.);
(c) Hypalon 40S (DuPont Performance Elastomers);
(d) N,N-m-Phenylene Bismaleimide.

Adhesive Formulation 3:

| Compound identity | % by weight |
|---|---|
| Pergut S130 (a) | 2.0 |
| Xylene | 69.6 |
| Titanium Dioxide | 2.0 |
| Heucophos ZPA (b) | 2.1 |
| Zinc Oxide | 4.2 |
| Chlorosulfonated Polyethylene (c) | 5.5 |
| HVA-2 (d) | 1.1 |
| 4,4-Diphenylbismaleimide | 1.1 |
| Hydrophobic Fumed Silica | 0.8 |
| Carbon Black | 4.5 |
| Quinone Dioxime | 3 |
| Cu nanopowder | 4 |

(a) Chlorinated Rubber (from Bayer Material Science);
(b) Zinc aluminium orthophosphate hydrate (from Heucotech Ltd.);
(c) Hypalon 40S (DuPont Performance Elastomers);
(d) N,N-m-Phenylene Bismaleimide.

Bond strengths of 9 to 12 N/mm were observed for Adhesive Formulations 1-3. Up to 80% rubber failure was also recorded.

Adhesive Formulation 4:

| Compound identity | % by weight |
|---|---|
| Pergut S130 (a) | 2.0 |
| Xylene | 69.6 |
| Titanium Dioxide | 2.0 |
| Heucophos ZPA (b) | 2.1 |
| Zinc Oxide | 4.2 |
| Chlorosulfonated Polyethylene (c) | 5.5 |
| HVA-2 (d) | 1.1 |
| 4,4-Diphenylbismaleimide | 1.1 |
| Hydrophobic Fumed Silica | 0.8 |
| Carbon Black | 4.5 |
| Quinone Dioxime | 3 |
| CuSCN | 4 |

(a) Chlorinated Rubber (from Bayer Material Science);
(b) Zinc aluminium orthophosphate hydrate (from Heucotech Ltd.);
(c) Hypalon 40S (DuPont Performance Elastomers);
(d) N,N-m-Phenylene Bismaleimide.

Bond strengths of 9.5 to 10 N/mm were observed for Adhesive Formulation 4. Up to 80% rubber failure was also recorded.

Tests were carried out using natural rubber of the following composition:

Rubber Composition

| Ingredient | Parts* |
|---|---|
| Natural Rubber (a) | 100 |
| Zinc Oxide | 3.5 |
| Stearic Acid | 2 |
| Carbon Black (b) | 40 |
| Naphthenic Oil (low viscosity) (c) | 5 |
| 1,2-Dihydro-2,2,4-Trimethylquinoline (d) | 2 |
| N-(1,3-dimethylbutyl)-N'-phenyl-p-phenylenediamine (e) | 1 |
| Hydrocarbon Waxes (f) | 2 |
| CBS (g) | 0.7 |
| Sulfur | 2.5 |

(a) NR SMR CV 60;
(b) SRF N762 black;
(c) Oil Strukthene 410;
(d) Flectol H;
(e) Santoflex 13 (HPPD);
(f) Sunproof Improved Wax;
(g) Vulcanisation accelerator, N-Cyclohexyl-2-benzothiazole.
*All parts are parts by weight Testing Methods To assess the efficacy of the adhesive systems described of the present invention in bonding rubbers to metal surfaces, a series of tests were performed according to the ASTM 429-B standard adjusted to a 45° angle. Metal substrates (2.54 cm (1 inch) wide, 10.16 cm (4 inch) long panels or coupons) were coated with the adhesive and adhered to natural rubber in a vulcanisation process. The natural rubber compositions were sulfur-cured compositions as set out in the Formulation tables.

The metal substrates were ultrasonically cleaned in an automated aqueous alkaline cleaner, rinsed with de-ionized water and blow-dried with hot air. The substrates may also be grit-blasted using a suitable abrasive agent.

Before application of the adhesive, 2.54 cm (one inch) of length (and also 2.54 cm wide (one inch)) on both ends of the metal coupon was masked to prevent that region being available for bonding to the rubber, leaving a central area of 2.54 cm (1 inch) in width and 5.08 cm (2 inches) in length available to bond to the rubber.

In the bonding operation of the present invention, the compositions are applied to metal substrates by either a dipping, spraying or brush method to ensure an even coverage, preferably after the substrate has been cleaned.

Drying may be carried out under ambient conditions, that is room temperature. Solvent evaporation rate can be increased by heat, forced air or both.

A layer of uncured rubber was then placed on each coupon and cured in a standard hydraulic vulcanisation press for a period of time specified by the rubber's cure profile. In the case of the natural rubber used in the bonding process in the present invention, the rubber was cured for 20 minutes at 150° C. under sufficient pressure to ensure intimate contact of the surfaces being bonded and the adhesive.

After curing the bonded samples were aged for 24 hours at room temperature before being subjected to testing and the tear pattern noted. Each sample was tested by the 45° angle modified ASTM 429-B standard using Instron test equipment (Instron tester, Model No. 5500R) at a steady load rate of 50 mm per minute until separation is complete.

"Rubber coverage" is the percentage of rubber remaining on the bonded metal substrate after peel testing. 100% rubber failure means that the rubber completely failed with no portion of the rubber peeling away from the surface of the metal (and equates to 100% rubber failure).

Generally, it is desirable that the rubber substrate fails before the metal to rubber bond fails. The result is achieved with certain of the formulations as set out above.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A bonding composition comprising:
   at least one copper compound; and
   at least one aromatic nitroso compound precursor, wherein the aromatic nitroso compound precursor comprises at least one alkoxy silane moiety.

2. A composition according to claim 1 further comprising an adhesion promoting agent.

3. A composition according to claim 2 wherein the adhesion promoting agent is a silane.

4. A composition according to claim 1 wherein the aromatic nitroso compound precursor comprises an aromatic oxime, an aromatic dioxime or combinations thereof.

5. A composition according to claim 1 wherein the aromatic nitroso compound precursor is mono- or dioxime of a compound selected from the group consisting of:

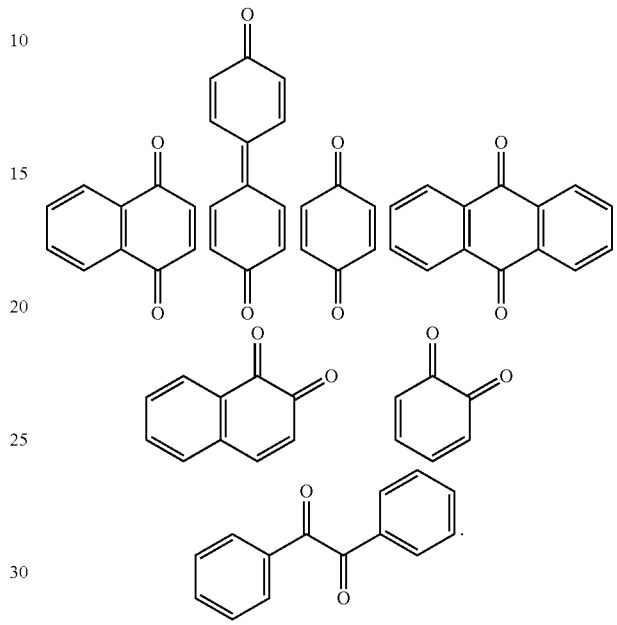

6. A composition according to claim 1 wherein the aromatic nitroso compound precursor comprises a nitrosobenzene precursor, a dinitrosobenzene precursor or combinations thereof.

7. A composition according to claim 1 wherein the copper compound is selected from the group consisting of Cu(I) compounds, Cu(II) compounds, Cu(0) compounds which may oxidise in situ to a Cu(I) or Cu(II) compound and combinations thereof.

8. A composition according to claim 1 wherein the copper compound is selected from the group consisting of copper nanopowder, CuO, $Cu_2O$, CuSCN, $Cu(SCN)_2$ and combinations thereof.

9. A composition according to claim 1 further comprising a suitable carrier vehicle.

10. A composition according to claim 1 wherein a nitrosobenzene, a dinitrosobenzene or a para-nitrosophenol moiety is generated in-situ from the aromatic nitroso compound precursor.

11. An assembly comprising a first substrate and a second substrate bonded together by the composition of claim 1.

12. A cured product comprising an elastomer and a composition according to claim 1.

13. A process for bonding two substrates together comprising applying a bonding composition comprising:
   a. at least one copper compound; and
   b. at least one aromatic nitroso compound precursor to at least one of the substrates and bringing the substrates together, wherein the aromatic nitroso compound precursor comprises at least one alkoxy silane moiety.

14. A process according to claim 13 wherein a first substrate comprises an elastomer to be bonded to another substrate.

15. A process according to claim 14 wherein the elastomer is a natural or synthetic rubber.

16. A process according to claim 15 wherein the aromatic nitroso compound precursor is oxidised in situ to an aromatic nitroso compound, which becomes anchored to the rubber.

17. A process according to claim 15 wherein the rubber substrate is vulcanised or cross-linked prior to bonding to the metal surface.

18. A process according to claim 15 wherein the rubber is vulcanised or cross-linked concurrently with bonding to the metal surface.

19. A process according to claim 13 wherein a first substrate comprises a natural or synthetic rubber to be bonded to a second substrate and the second substrate is a metallic substrate.

\* \* \* \* \*

UNITED STATES PATENT AND TRADEMARK OFFICE
CERTIFICATE OF CORRECTION

| | | |
|---|---|---|
| PATENT NO. | : 8,642,689 B2 | Page 1 of 1 |
| APPLICATION NO. | : 13/234919 | |
| DATED | : February 4, 2014 | |
| INVENTOR(S) | : Nigel Fay et al. | |

It is certified that error appears in the above-identified patent and that said Letters Patent is hereby corrected as shown below:

Title Page, Item (57), ABSTRACT, line 3: Change "oxidize" to -- oxidise --.

Signed and Sealed this
Twenty-ninth Day of March, 2016

Michelle K. Lee
*Director of the United States Patent and Trademark Office*